United States Patent
Fukuhara et al.

(10) Patent No.: US 10,604,592 B2
(45) Date of Patent: Mar. 31, 2020

(54) DISPERSION STABILIZER FOR SUSPENSION POLYMERIZATION, AND METHOD FOR PRODUCING VINYL RESIN

(71) Applicant: KURARAY CO., LTD., Kurashiki-shi (JP)

(72) Inventors: Tadahito Fukuhara, Kurashiki (JP); Yosuke Kumaki, Kurashiki (JP); Samuel Michel, Hattersheim am Main (DE); Dirk Hartmann, Hattersheim am Main (DE)

(73) Assignee: KURARAY CO., LTD., Kurashiki-shi (JP)

( * ) Notice: Subject to any disclaimer, the term of this patent is extended or adjusted under 35 U.S.C. 154(b) by 322 days.

(21) Appl. No.: 15/302,307

(22) PCT Filed: Apr. 8, 2015

(86) PCT No.: PCT/JP2015/060959
§ 371 (c)(1),
(2) Date: Oct. 6, 2016

(87) PCT Pub. No.: WO2015/156312
PCT Pub. Date: Oct. 15, 2015

(65) Prior Publication Data
US 2017/0029534 A1    Feb. 2, 2017

(30) Foreign Application Priority Data
Apr. 9, 2014   (JP) .................... 2014-080601

(51) Int. Cl.
| | | |
|---|---|---|
| *C08F 2/20* | (2006.01) | |
| *C08F 2/24* | (2006.01) | |
| *C08F 283/06* | (2006.01) | |
| *C08L 51/00* | (2006.01) | |
| *C08F 14/06* | (2006.01) | |
| *C08F 18/04* | (2006.01) | |
| *C08F 18/08* | (2006.01) | |
| *C08F 2/30* | (2006.01) | |
| *C08F 2/18* | (2006.01) | |
| *C08L 29/04* | (2006.01) | |

(52) U.S. Cl.
CPC .................. *C08F 2/20* (2013.01); *C08F 2/18* (2013.01); *C08F 2/24* (2013.01); *C08F 2/30* (2013.01); *C08F 14/06* (2013.01); *C08F 18/04* (2013.01); *C08F 18/08* (2013.01); *C08F 283/06* (2013.01); *C08L 51/00* (2013.01); *C08L 29/04* (2013.01)

(58) Field of Classification Search
CPC ...... C08F 2/20; C08F 2/18; C08F 2/24; C08F 2/30; C08F 14/06; C08F 18/04; C08F 18/08; C08F 283/06; C08L 51/00; C08L 29/04
USPC ........................................................ 524/803
See application file for complete search history.

(56) References Cited

U.S. PATENT DOCUMENTS

| | | |
|---|---|---|
| 5,286,779 A | 2/1994 | Chuang et al. |
| 5,308,911 A | 5/1994 | Takada et al. |
| 2015/0274955 A1 | 10/2015 | Fukuhara et al. |

FOREIGN PATENT DOCUMENTS

| | | | | |
|---|---|---|---|---|
| EP | 0 135 661 A1 | | 4/1985 | |
| EP | 0135661 A1 | * | 4/1985 | .......... B01F 17/0057 |
| GB | 649505 A | * | 1/1951 | ............ C09J 131/04 |
| JP | 48-75486 A | | 10/1973 | |
| JP | 54-33283 A | | 3/1979 | |
| JP | 58-179201 A | | 10/1983 | |
| JP | 5-345805 A | | 12/1993 | |
| JP | 9-132608 A | | 5/1997 | |
| JP | 2005-82665 A | | 3/2005 | |
| JP | 2005082665 A | * | 3/2005 | |
| WO | WO-9825976 A2 | * | 6/1998 | ............ C08F 218/08 |
| WO | 2007/069422 A1 | | 6/2007 | |
| WO | 2014/069616 A1 | | 5/2014 | |

OTHER PUBLICATIONS

International Search Report dated May 19, 2015 in PCT/JP2015/060959 filed Apr. 8, 2015.

* cited by examiner

*Primary Examiner* — Kelechi C Egwim
(74) *Attorney, Agent, or Firm* — Oblon, McClelland, Maier & Neustadt, L.L.P.

(57) ABSTRACT

Provided is a dispersion stabilizer for suspension polymerization comprising an aqueous emulsion containing a dispersant (A), a dispersoid (B), a graft polymer (C), and an aqueous medium, wherein the dispersant (A) contains a surfactant, the dispersoid (B) contains a polymer having an ethylenically unsaturated monomer unit, the graft polymer (C) is obtained by graft polymerization of the ethylenically unsaturated monomer with the dispersant (A), a mass ratio [A/(A+B+C)] is 0.001 or more and less than 0.18, a mass ratio [C/(A+B+C)] is 0 or more and less than 0.04, and the total content of the dispersant (A), the dispersoid (B), and the graft polymer (C) is 35 to 70 mass %. A vinyl polymer to be obtained by suspension polymerization of a vinyl compound using the dispersion stabilizer has good plasticizer absorption. Further, the number of fish-eyes that occur when the vinyl polymer is formed is small, and the hue deterioration is also suppressed. Further, the dispersion stabilizer also has excellent handleability.

9 Claims, No Drawings

DISPERSION STABILIZER FOR SUSPENSION POLYMERIZATION, AND METHOD FOR PRODUCING VINYL RESIN

TECHNICAL FIELD

The present invention relates to a dispersion stabilizer for suspension polymerization comprising an aqueous emulsion containing: a dispersant; a dispersoid containing a polymer having an ethylenically unsaturated monomer unit; and a graft polymer as an optional component. Further, the present invention relates to a method for producing a vinyl resin by suspension polymerization of a vinyl compound in the presence of the dispersion stabilizer for suspension polymerization.

BACKGROUND ART

Conventionally, a method using partially saponified polyvinyl alcohol (hereinafter, polyvinyl alcohol may be abbreviated as PVA) as a dispersion stabilizer for suspension polymerization of a vinyl compound (such as vinyl chloride) has been known. However, the partially saponified PVA has low solubility in water, and it is difficult to increase the solid content concentration, resulting in insufficient handleability. For such reasons, in order to improve the handleability, attempts to use an aqueous emulsion as a dispersion stabilizer for suspension polymerization have been made. For example, Patent Documents 1 and 2 disclose methods using an aqueous emulsion as a dispersion stabilizer for suspension polymerization of a vinyl compound.

Further, in recent years, the dispersion stabilizer is required to have performance such as: (1) allowing a vinyl polymer that has high plasticizer absorption and that can be easily processed to be obtained even if the used amount is small; (2) having a small number of fish-eyes when the vinyl polymer is formed into a sheet even if the used amount is small; (3) reducing or suppressing hue deterioration of the vinyl polymer due to heat in the formation, even if the used amount is small; and (4) having excellent handleability of the dispersion stabilizer.

Patent Document 1 discloses a dispersion stabilizer for suspension polymerization of a vinyl compound composed of an aqueous emulsion with a high ratio of a graft polymer. The dispersion stabilizer can increase the solid content concentration to a concentration of about 15%, and the handleability is slightly improved. However, it is difficult to increase the solid content concentration any more, and the handleability and the economic efficiency are insufficient. Further, other performance is also insufficient. Patent Document 2 discloses a dispersion stabilizer for suspension polymerization composed of an aqueous emulsion with a high ratio of a graft polymer. In the dispersion stabilizer for suspension polymerization, the viscosity is reduced by reducing the amount of polyvinyl alcohol, so that the solid content concentration can be increased to about 30%. Therefore, the handleability is more improved than in the dispersion stabilizer disclosed in Patent Document 1. However, the handleability is still insufficient.

PRIOR ART DOCUMENTS

Patent Documents

Patent Document 1: JP 2005-082665 A
Patent Document 2: JP 09-132608 A

SUMMARY OF THE INVENTION

Problems to be Solved by the Invention

It is an object of the present invention to provide a dispersion stabilizer for suspension polymerization that satisfies the aforementioned required performances (1) to (4).

Means for Solving the Problems

The aforementioned problem is solved by providing a dispersion stabilizer for suspension polymerization comprising: an aqueous emulsion containing a dispersant (A), a dispersoid (B), a graft polymer (C), and an aqueous medium, wherein the dispersant (A) contains a surfactant, the dispersoid (B) contains a polymer having an ethylenically unsaturated monomer unit, the graft polymer (C) is obtained by graft polymerization of the ethylenically unsaturated monomer with the dispersant (A), a mass ratio [A/(A+B+C)] of the dispersant (A) with respect to the total amount of the dispersant (A), the dispersoid (B), and the graft polymer (C) is 0.001 or more and less than 0.18, a mass ratio [C/(A+B+C)] of the graft polymer (C) with respect to the total amount of the dispersant (A), the dispersoid (B), and the graft polymer (C) is 0 or more and less than 0.04, and the total content of the dispersant (A), the dispersoid (B), and the graft polymer (C) is 35 to 70 mass %.

It is suitable that the dispersoid (B) in the dispersion stabilizer contain polyvinyl ester, and it is more suitable that the polyvinyl ester is polyvinyl acetate. It is also suitable that an weight-average molecular weight of a solid content in the aqueous emulsion as measured by gel permeation chromatography is 1,000,000 or less. It is also suitable that the dispersant (A) contains a nonionic surfactant or a cationic surfactant.

The aforementioned problem is solved also by providing a method for producing the dispersion stabilizer, comprising obtaining the aqueous emulsion by polymerization of 100 parts by mass of the ethylenically unsaturated monomer in the aqueous medium in the presence of 1 to 20 parts by mass of the dispersant (A). At this time, it is suitable that the aqueous emulsion is obtained by polymerization of the ethylenically unsaturated monomer in the presence of a chain transfer agent and the dispersant (A).

A method for producing a vinyl resin, including performing suspension polymerization of a vinyl compound in an aqueous medium in the presence of the aforementioned dispersion stabilizer is a suitable embodiment of the present invention. At this time, it is suitable that a mass ratio (vinyl compound/aqueous medium) of the vinyl compound with respect to the aqueous medium is 0.57 to 1.25.

Effects of the Invention

When the dispersion stabilizer of the present invention is used for suspension polymerization of the vinyl compound, vinyl polymer particles that have high plasticizer absorption and that can be easily processed are obtained. Further, the number of fish-eyes that occur when the obtained vinyl polymer is formed into a sheet is small, and further hue deterioration of the vinyl polymer due to heat during formation is suppressed. In particular, even when the dispersion stabilizer is used in a small amount, these effects are exerted. Further, a dispersion stabilizer with a high solid content concentration can be produced, and a dispersion stabilizer having excellent productivity and handleability is provided.

MODES FOR CARRYING OUT THE INVENTION

<Dispersion Stabilizer for Suspension Polymerization>

The dispersion stabilizer for suspension polymerization of the present invention comprises an aqueous emulsion containing a dispersant (A), a dispersoid (B), a graft polymer (C), and an aqueous medium, wherein the dispersant (A) contains a surfactant, the dispersoid (B) contains a polymer having an ethylenically unsaturated monomer unit, the graft polymer (C) is obtained by graft polymerization of the ethylenically unsaturated monomer with the dispersant (A), a mass ratio [A/(A+B+C)] of the dispersant (A) with respect to the total amount of the dispersant (A), the dispersoid (B), and the graft polymer (C) is 0.001 or more and less than 0.18, a mass ratio [C/(A+B+C)] of the graft polymer (C) with respect to the total amount of the dispersant (A), the dispersoid (B), and the graft polymer (C) is 0 or more and less than 0.04, and the total content of the dispersant (A), the dispersoid (B), and the graft polymer (C) is 35% to 70 mass %. Hereinafter, the aqueous emulsion may hereinafter be abbreviated simply as emulsion. Hereinafter, each component will be described in detail.

[Aqueous Emulsion]

The dispersion stabilizer for suspension polymerization of the present invention comprises an aqueous emulsion containing the dispersant (A), the dispersoid (B), the graft polymer (C), and aqueous medium. The dispersant (A) used in the present invention contains a surfactant. Examples of the surfactant include a nonionic surfactant and an ionic surfactant. One of these may be used alone, or two or more of them may be used in combination. In view of economic efficiency, stabilizing the emulsion, and improving the performance as the dispersant for suspension polymerization, preferable examples of the surfactant include a nonionic surfactant, a cationic surfactant, and an amphoteric surfactant. Among these, in order to improve the performance of the dispersion stabilizer for suspension polymerization by adjusting the ratio of the graft polymer (C), the nonionic surfactant and the cationic surfactant are more preferable.

Examples of the nonionic surfactant contained in the dispersant (A) in the present invention include: polyoxyethylene polyoxyalkylene glycol such as polyoxyethylene polyoxypropylene glycol, polyethylene glycol ester such as polyethylene glycol stearate, polyoxyethylene alkyl ether such as polyoxyethylene lauryl ether, and a surfactant containing an aromatic ring and a polyoxyethylene group such as polyoxyethylene distyrenated phenyl ether, polyoxyethylene sorbitan ester such as polyoxyethylene sorbitan monolaurate, glycerin ester such as glycerol monostearate, and a reactive surfactant such as polyoxyethylene allyl glycidyl nonyl phenyl ether. One of these may be used alone, or two or more of them may be used in combination. In view of economic efficiency, improving the performance of the dispersant for suspension polymerization, and stabilizing the emulsion, polyoxyethylene alkyl ether, polyoxyethylene sorbitan ester, and glycerin ester are suitably used.

Preferable examples of the ionic surfactant contained in the dispersant (A) in the present invention include cationic surfactants, for example alkyl amine acetate such as stearylamine acetate, alkyl ammonium salt such as stearyl trimethyl ammonium chloride, and alkyl betaine such as lauryl betaine. One of these may be used alone, or two or more of them may be used in combination. In view of economic efficiency, improving the performance of the dispersant for suspension polymerization, and stabilizing the emulsion, alkyl ammonium salt and alkyl betaine are more preferable.

The content of the surfactant in the dispersant (A) is generally 50 mass % or more, preferably 80 mass % or more, more preferably 95 mass % or more.

In the present invention, the dispersant (A) may further contain polyvinyl alcohol. In view of stabilizing and handling the emulsion, the degree of saponification of the polyvinyl alcohol is generally 50 mol % or more, preferably 60 mol % or more, more preferably 70 mol % or more, further preferably 73 mol % or more, particularly preferably 78 mol % or more. The upper limit is preferably 99.5 mol %, more preferably 95 mol %, further preferably 90 mol %. Further, the viscosity-average degree of polymerization of the polyvinyl alcohol is generally 100 to 8000, preferably 100 to 4000, more preferably 150 to 3000. It should be noted that the degree of saponification of the polyvinyl alcohol is a value obtained by measurement according to JIS-K6726.

The aforementioned polyvinyl alcohol can be obtained according to a conventionally known method by polymerization of vinyl ester and saponification of the obtained polymer using a conventional method. As the method for polymerization of vinyl ester, conventionally known methods such as a solution polymerization method, a bulk polymerization method, a suspension polymerization method, and an emulsion polymerization method can be used. A polymerization catalyst is appropriately selected from azo catalysts, peroxide catalysts, redox catalysts, or the like, depending on the polymerization method. As a saponification reaction, conventionally known alcoholysis, hydrolysis, or the like, using an alkali catalyst or an acid catalyst, can be used. Above all, a saponification reaction using methanol as a solvent and a caustic soda (NaOH) catalyst is convenient and most preferable.

As the vinyl ester unit constituting the aforementioned polyvinyl alcohol, there are units derived from various vinyl ester compounds, but examples thereof include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Above all, vinyl acetate is most preferable.

The polyvinyl alcohol contained in the dispersant (A) may be obtained by copolymerization of vinyl ester with another monomer, as long as the effects of the present invention are not inhibited. Examples of the other monomer that can be used include α-olefins such as ethylene, propylene, n-butene, and isobutylene; acrylic acid and salts thereof; acrylamide; acrylamide derivatives such as N-methyl acrylamide, N-ethyl acrylamide, N,N-dimethyl acrylamide, diacetoneacrylamide, acrylamidopropanesulfonic acid and salts thereof, acrylamidopropyldimethylamine and salts thereof or quaternary salts thereof, and N-methylol acrylamide and derivatives thereof; methacrylamide; methacrylamide derivatives such as N-methyl methacrylamide, N-ethyl methacrylamide, methacrylamidopropanesulfonic acid and salts thereof, methacrylamidopropyldimethylamine and salts thereof or quaternary salts thereof, and N-methylol methacrylamide and derivatives thereof; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether, and 2,3-diacetoxy-1-vinyloxypropane, nitriles such as acrylonitrile, and methacrylonitrile; vinyl halides such as vinyl chloride, and vinyl fluoride; vinylidene halides such as vinylidene chloride, and vinylidene fluoride; allyl compounds such as allyl acetate, 2,3-diacetoxy-1-allyloxypropane, and allyl chloride; unsaturated dicarboxylic acids such as maleic acid, itaconic acid, and fumaric acid, and salts or esters thereof; vinylsilyl compounds such as vinyltrimethoxysilane; and isopropenyl acetate. Further, polyvinyl alcohol with a high content of 1,2 glycol obtained by saponification of a polymer obtained by polymerization of vinyl ester at a higher temperature than in general polymerization conditions also can be preferably used. In this case, the content of 1,2-glycol bond is not particularly limited, but polyvinyl alcohol with the content of 1.9 mol % or more, preferably 2.0 mol % or more, further preferably 2.1 mol % or more, is used. When the 1,2-glycol bond falls within the aforementioned range, a dispersion stabilizer in which particles that are contained in the emulsion have a smaller particle size can be obtained.

Further, the polyvinyl alcohol may be synthesized using a chain transfer agent for the purpose of adjusting the degree of polymerization of the polyvinyl alcohol contained in the dispersant (A) or introducing modifications at terminals. Examples of the chain transfer agent include: aldehydes such as acetaldehyde, and propionaldehyde; ketones such as acetone, and methyl ethyl ketone; thiols such as 2-hydroxy ethanethiol, 3-mercaptopropionic acid, dodecanethiol, and thioacetic acid; hydrocarbon halides such as carbon tetrachloride, trichloroethylene, and perchloroethylene; and phosphinic acid salts such as sodium phosphinate monohydrate. Above all, thiols, aldehydes, and ketones are suitably used. The amount of the chain transfer agent to be added may be determined corresponding to the chain transfer constant of the chain transfer agent to be added and the target degree of polymerization of the polyvinyl ester. Generally, 0.1 mass % or more and 10 mass % or less with respect to the vinyl ester is desirable.

The value of weight-average molecular weight/number-average molecular weight (Mw/Mn) of the polyvinyl alcohol contained in the dispersant (A) is not particularly limited, but is generally 10 or less, preferably 6 or less, in view of the stability of the emulsion.

The block character of remaining vinyl ester groups of the polyvinyl alcohol contained in the dispersant (A) is not particularly limited, but is generally 1.0 or less, preferably 0.8 or less, more preferably 0.6 or less, in order to control the particle size of the emulsion to ensure the stability of the emulsion.

When the dispersant (A) contains the polyvinyl alcohol, the content of the polyvinyl alcohol in the dispersant (A) is generally 50 mass % or less, preferably 20 mass % or less, more preferably 5 mass % or less.

In the present invention, the dispersant (A) may further contain a water-soluble cellulose. Examples of the water-soluble cellulose to be used include various cellulose derivatives such as methylcellulose, carboxymethylcellulose, hydroxyethylcellulose, and hydroxypropylcellulose. The viscosity thereof is not particularly limited, but is generally 0.5 mPa·s or more and 5000 mPa·s or less as a 2% aqueous solution at 20° C., in view of stabilizing and handling the emulsion.

Examples of the ethylenically unsaturated monomer used as a raw material for the polymer having the ethylenically unsaturated monomer unit contained in the dispersoid (B) include olefins such as ethylene, propylene, and isobutylene; halogenated olefins such as vinyl chloride, vinyl fluoride, vinylidene chloride, and vinylidene fluoride; vinyl esters such as vinyl formate, vinyl acetate, vinyl propionate, vinyl butyrate, vinyl valerate, vinyl laurate, vinyl stearate, vinyl pivalate, isopropenyl acetate, vinyl palmitate, and vinyl benzoate; acrylic acid; methacrylic acid; acrylic acid esters such as methyl acrylate, ethyl acrylate, butyl acrylate, 2-ethylhexyl acrylate, dodecyl acrylate, and 2-hydroxyethyl acrylate; methacrylic acid esters such as methyl methacrylate, ethyl methacrylate, butyl methacrylate, 2-ethylhexyl methacrylate, dodecyl methacrylate, and 2-hydroxyethyl methacrylate; dimethylaminoethyl acrylate, dimethylaminoethyl methacrylate, and quaternized products of these. Further, examples thereof can include: acrylamide monomers such as acrylamide, methacrylamide, N-methylol acrylamide, N,N-dimethyl acrylamide, acrylic amide-2-methylpropanesulfonic acid, and sodium salts thereof; styrene monomers such as styrene, α-methylstyrene, p-styrenesulfonic acid, and sodium salts and potassium salts thereof; and other N-vinylpyrrolidone. One of these unsaturated monomers can be used alone, or two or more of them may be mixed for use. These unsaturated monomers constitute the ethylenically unsaturated monomer unit of the polymer to be obtained. Above all, the polymer having the ethylenically unsaturated monomer unit contained in the dispersoid (B) is preferably polyvinyl ester, more preferably polyvinyl acetate, in view of the economic efficiency and the performance of the dispersion stabilizer for suspension polymerization.

Examples of vinyl ester monomers used as a raw material of the polyvinyl ester include vinyl formate, vinyl acetate, vinyl propionate, vinyl butyrate, vinyl valerate, vinyl laurate, vinyl stearate, vinyl pivalate, isopropenyl acetate, vinyl palmitate, and vinyl benzoate. These are subjected to homopolymerization or copolymerization for use within a range in which the effects of the present invention are not inhibited. Above all, use by homopolymerization of vinyl acetate or copolymerization of ethylenically unsaturated monomers as described above with vinyl acetate serving as a main component is preferable, in view of productivity, economic efficiency, and handleability.

The content of the polymer having the ethylenically unsaturated monomer unit in the dispersoid (B) is generally 50 mass % or more, preferably 80 mass % or more, more preferably 95 mass % or more, and it is further preferable that the dispersoid (B) substantially consist only of the polymer having the ethylenically unsaturated monomer unit.

Examples of the aqueous medium contained in the emulsion include water, and a solution containing water and an organic solvent. The amount of water in the aqueous medium is preferably 90 mass % or more.

The average particle size of the particles contained in the emulsion is not particularly limited, but the average particle size as measured by a dynamic light scattering method is preferably 5 μm or less, more preferably 3 μm or less, further preferably 2.5 μm or less. On the other hand, the average particle size is preferably 0.05 μm or more. In the case where the average particle size exceeds 5 μm, the stability of the emulsion may possibly decrease. On the other hand, in the case where the average particle size is less than 0.05 μm, fish-eyes in a sheet into which a vinyl resin obtained using the dispersant for suspension polymerization is processed may possibly increase. Otherwise, a large amount of the dispersant (A) needs to be used in synthesis of the emulsion, and there may possibly be a concern in view of the economic efficiency as well. The measurement by the dynamic light scattering method can be performed, for example, using a laser zeta electrometer, ELS-8000, manufactured by Otsuka Electronics Co., Ltd. The particle size of the particles is adjusted by appropriately selecting the mass ratio of the dispersant (A) and the dispersoid (B), and further the production conditions of the emulsion (such as polymerization temperature, polymerization time, type of monomer, type of polymerization initiator, addition timing of the dispersant (A), use amount of chain transfer agent, etc.) in the synthesis. Further, the stability of the emulsion can be controlled also by adjusting the solid content concentration of the emulsion.

The production method of the emulsion is not particularly limited, but a method of polymerizing the aforementioned ethylenically unsaturated monomer(s) in the aqueous medium in the presence of the dispersant (A) is preferable. At this time, the polymer having the ethylenically unsaturated monomer unit contained in the dispersoid (B) is formed. Specifically, a method in which the aforementioned ethylenically unsaturated monomer(s) is temporarily or continuously added into an aqueous solution of the dispersant (A), and a polymerization initiator such as a peroxide polymerization initiator, e.g., hydrogen peroxide, ammonium persulfate, and potassium persulfate is added thereto, so as to achieve emulsion polymerization is preferable. It is also possible to employ a method in which the dispersoid (B) is synthesized in advance, followed by emulsification by mixing it with the dispersant (A) in water, but it is not preferable because the storage stability of the emulsion decreases and precipitation tends to occur. The polymerization initiator may be used in combination with a reductant so as to be used in a redox system in some cases. In such a case, hydrogen peroxide is generally used together with tartaric acid, sodium tartrate, L-ascorbic acid, Rongalite, or the like. Further, ammonium persulfate and potassium persulfate are used together with sodium bisulfite, sodium hydrogen carbonate, or the like.

The amount of the dispersant (A) to be used is preferably 1 to 20 parts by mass, more preferably 1 to 15 parts by mass, further preferably 1 to 12 parts by mass, with respect to 100 parts by mass of the ethylenically unsaturated monomer. In the case where the dispersant (A) is used in an amount greater than 20 parts by mass, some problems may occur: an increase in fish-eyes that occur when a vinyl resin produced using the dispersant for suspension polymerization is processed into a sheet and hue deterioration during the processing. Further, in the case where the amount of the dispersant (A) to be used is less than 1 part by mass, the stability of the emulsion may possibly decrease, for example, due to an increase in particle size of the emulsion to be obtained. Also, there is a possibility that the emulsion cannot be obtained due to aggregating during the synthesis of the emulsion. Further, the performance of the dispersion stabilizer for suspension polymerization to be obtained may possibly decrease.

It is preferable to obtain the aqueous emulsion by polymerizing the ethylenically unsaturated monomer in the aqueous medium in the presence of a chain transfer agent and the dispersant (A). Use of the chain transfer agent further stabilizes the emulsion. Further, the ratio of the graft polymer (C) in the emulsion is easily adjusted, and the weight-average molecular weight of the emulsion can be reduced. Further, the performance as the dispersion stabilizer for suspension polymerization is further improved. As the chain transfer agent, thiol compounds and aldehyde compounds are preferable. One of these may be used alone, or two or more of them may be used in combination. Among these, thiol compounds are more preferable because of their high reactivity. The chain transfer agent may be either temporarily or continuously added. Further, the amount of the chain transfer agent to be used is not particularly limited, but is generally 0.01 to 50 parts by mass, preferably 0.05 to 40 parts by mass, further preferably 0.1 to 30 parts by mass, with respect to 100 parts by mass of the ethylenically unsaturated monomer.

The aforementioned thiol compounds are not particularly limited, and either alkyl thiols or thiols having a functional group can be used. In the case of using alkyl thiols, straight chain or branched alkyl thiols having 4 or more and 18 or less carbon atoms are preferable in view of handleability and odor. Examples thereof include n-butanethiol, n-pentanethiol, n-hexanethiol, cyclohexanethiol, adamantylthiol, n-heptanethiol, n-octanethiol, n-nonanethiol, n-decanethiol, n-undecanethiol, n-dodecanethiol, t-dodecanethiol, n-hexadecanethiol, and n-octadecanethiol. Examples of the thiols having a functional group include thioacetic acid, mercaptoacetic acid, 3-mercaptopropionic acid, 3-mercaptopropanesulfonic acid, and 2-mercaptoethanol. However, there is no limitation only to these.

The emulsion of the present invention needs to contain the dispersant (A) and the dispersoid (B). Further, the emulsion of the present invention may contain the graft polymer (C) obtained by graft polymerization of the ethylenically unsaturated monomer with the dispersant (A), as an optional component. Each component has a different action when the emulsion of the present invention is used as a dispersion stabilizer for suspension polymerization of a vinyl compound. The dispersant (A) is present at the interface of the vinyl compound to serve as a surfactant, to allow the dispersoid (B) to be efficiently dissolved in the vinyl compound, to stabilize dispersion of the dispersoid (B) and the graft polymer (C), to reduce the number of fish-eyes when the vinyl resin is processed into a sheet, or to improve the hue. The dispersoid (B) is dissolved in the vinyl compound during the suspension polymerization and is involved in the morphology change inside the vinyl polymer particles to be obtained so as to serve to reduce the number of fish-eyes and improve the plasticizer absorption. The graft polymer (C) has both a hydrophilic group and a part dissolved in the vinyl compound, and thus is present at the interface of the vinyl compound. The graft polymer (C) has the performance of both the dispersant (A) and the dispersoid (B), but in particular, the effects of improving the hue and reducing the number of fish-eyes when the vinyl resin is processed into a sheet are lower than in the dispersant (A) and the dispersoid (B). Accordingly, the performance as the dispersant for suspension polymerization is improved by reducing the ratio of the graft polymer (C) as much as possible. However, the graft polymer (C) has both a hydrophilic group and a hydrophobicity group and thus has an action to improve the stability of the aqueous emulsion, particularly in a low-concentration aqueous emulsion. The graft polymer (C) is generally produced during polymerization of the ethylenically unsaturated monomer in the presence of the dispersant (A). These three kinds of components interact each other, and contribute, as the dispersion stabilizer for suspension polymerization, to improving the polymerization stability of the vinyl compound, the plasticizer absorption of the vinyl polymer particles to be obtained, the number of fish-eyes when the vinyl resin is processed into a sheet, and the hue. That is, the ratio of these components is important to improve the performance of the dispersion stabilizer for suspension polymerization.

In the emulsion, a mass ratio [A/(A+B+C)] of the dispersant (A) with respect to the total amount of the dispersant (A), the dispersoid (B), and the graft polymer (C) is required to be 0.001 or more and less than 0.18, preferably 0.005 or more and 0.15 or less, further preferably 0.01 or more and 0.12 or less. In the case where the mass ratio [A/(A+B+C)]

is less than 0.001, it is difficult to stabilize dispersion of the dispersoid (B) and the graft polymer (C) contained in the emulsion, leading to problems such as that the solution stability of the emulsion decreases, the plasticizer absorption of the vinyl polymer particles to be obtained in use as the dispersion stabilizer for suspension polymerization decreases, and fish-eyes when the vinyl resin is processed into a sheet increase. Further, in the case where the mass ratio [A/(A+B+C)] is 0.18 or more, there are problems such as that the emulsion viscosity increases to cause a difficulty in handling as a high-concentration solution, the plasticizer absorption of the vinyl polymer particles to be obtained in use as the dispersion stabilizer for suspension polymerization decreases, fish-eyes when the vinyl resin is processed into a sheet increases, and the hue deteriorates. The mass ratio [A/(A+B+C)] can be adjusted, in the case of using the dispersant (A) containing polyvinyl alcohol in the emulsion synthesis, by adjusting the degree of saponification or the degree of polymerization thereof. As other methods, the mass ratio [A/(A+B+C)] can be adjusted, by: using the dispersant (A) in which a graft point is present; adjusting the amount of the dispersant (A) to be used; or changing the probability of the graft reaction by, for example, using a chain transfer agent or an additive. The total amount of the dispersant (A), the dispersoid (B), and the graft polymer (C) can be determined by measuring the solid content obtained by drying the emulsion. The amount of the dispersant (A) in the emulsion can be determined by the following method. After centrifugation of the emulsion, a supernatant solution is collected. Only the dispersant (A) is contained in the supernatant solution. The amount of the dispersant (A) in the emulsion can be determined by measuring the amount of the solid content obtained by drying the supernatant solution. The mass ratio [A/(A+B+C)] can be determined from these values.

As described above, the emulsion may contain the graft polymer (C), but a mass ratio [C/(A+B+C)] of the graft polymer (C) with respect to the total amount of the dispersant (A), the dispersoid (B), and the graft polymer (C) is required to be 0 or more and less than 0.04. Examples of the effects of the graft polymer (C) include improving the plasticizer absorption of the vinyl polymer particles to be obtained, and improving the hue when the vinyl resin is processed into a sheet. However, these effects are lower than in the dispersant (A) and the dispersoid (B), which may cause problems such as an increase in fish-eyes when the vinyl resin is processed into a sheet, in some cases. Therefore, in the case where the mass ratio [C/(A+B+C)] is 0.04 or more, the ratios of the dispersant (A) and the dispersoid (B) decrease, thereby causing problems such as a decrease in plasticizer absorption of the vinyl polymer particles to be obtained in use as the dispersion stabilizer for suspension polymerization, hue deterioration and an increase in fish-eyes when the vinyl resin is processed into a sheet. Further, when the ratio of the graft polymer (C) increases, the later-described weight-average molecular weight of the solid content of the emulsion increases, and the viscosity may possibly increase, depending on the production conditions of the emulsion. In such a case, the stability of the emulsion itself may be improved in some cases particularly in a low-concentration region, whereas it becomes difficult to obtain an emulsion with high solid content concentration, and the economic efficiency may decrease in some cases. The mass ratio [C/(A+B+C)] is adjusted by the following method, for example. It can be adjusted, in the case of using the dispersant (A) containing polyvinyl alcohol, by adjusting the degree of saponification or the degree of polymerization thereof. As other methods, it can be adjusted by: using the dispersant (A), such as a surfactant, to which grafting is difficult; adjusting the amount of the dispersant (A) to be used; changing the amount of ethylenically unsaturated monomer to be grafted onto the dispersant (A) by, for example, changing the conditions in the synthesis or using a chain transfer agent; or changing the synthesis conditions such as the temperature in the synthesis or additives to be used.

There are various methods for determining the mass ratio [C/(A+B+C)]. Specifically, examples thereof include a method of washing the emulsion with acetone and water (see Patent Documents 1 and 2), and a determination method by subtracting the ratio of the dispersant (A) with respect to the total solid content of the emulsion from the ratio of toluene insolubles with respect to the total solid content of the emulsion (see JP H10-081865 A). The former is a method of removing the dispersoid (B) by acetone and thereafter removing the dispersant (A) by water. In the latter, a mass ratio [(A+C)/(A+B+C)] of the total amount of the graft polymer (C) and the dispersant (A) with respect to the total solid content (A+B+C) in the emulsion is determined by using the fact that the components of the toluene insolubles are the graft polymer (C) and the dispersant (A). The mass ratio [C/(A+B+C)] can be determined by subtracting the mass ratio [A/(A+B+C)] from the mass ratio [(A+C)/(A+B+C)]. These two are equivalent, and therefore the values of the ratio of the graft polymer are almost the same even if either of the methods is used. In the case of using the former method for determination, the same sample is washed with water and acetone, and therefore the ratio of the graft polymer remaining undissolved in water and acetone is 0 or more. In the case of using the latter method, different samples are used for two types of measurements, and therefore the ratio of the graft polymer may take a negative value in some cases, depending on the margin of error of the measurements. Therefore, the ratio of the graft polymer can be determined more accurately by measuring the toluene insolubles of precipitate from which the dispersant is removed by centrifugation of the emulsion solution. Specifically, the measurement can be performed by the method described in Examples.

The weight-average molecular weight of the solid content of the emulsion measured by gel permeation chromatography is preferably 1,000,000 or less, more preferably 700,000 or less, further preferably 500,000 or less. The value of the weight-average molecular weight can be adjusted, in the case of using the dispersant (A) containing polyvinyl alcohol in the emulsion synthesis, by changing the length of the backbone or branch of the graft polymer, for example, by adjusting the degree of saponification or the degree of polymerization, by adjusting the type or amount of the dispersant (A) to be used, or by selecting a polymerization initiator, or using a chain transfer agent. The weight-average molecular weight exceeding 1,000,000 may possibly cause a decrease in plasticizer absorption of the vinyl polymer particles to be obtained using the dispersion stabilizer for suspension polymerization, an increase in fish-eyes when the vinyl resin is processed into a sheet, a deterioration in hue, an increase in viscosity of the emulsion to be obtained, a deterioration in storage stability, or the like.

The total content of the dispersant (A), the dispersoid (B), and the graft polymer (C) in the emulsion is 35 mass % or more and 70 mass % or less, preferably 40 mass % or more and 70 mass % or less, more preferably 50 mass % or more and 65 mass % or less. The content less than 35% is not preferable in view of the productivity and the economic efficiency. Further, problems such as that the solution stability of the emulsion decreases due to an excessive decrease in viscosity of the emulsion occur. The content exceeding 70 mass % cause an increase in viscosity of the emulsion and a decrease in handleability.

[Other Components]

The dispersion stabilizer for suspension polymerization of the present invention may contain other various additives as long as the gist of the present invention is not impaired. Examples thereof include polymerization regulators such as aldehyde, halide hydrocarbon, and mercaptan, polymerization inhibitors such as phenol compounds, sulfur compounds, and N-oxide compounds; pH adjusters; crosslinking agents; preservatives; fungicides; antiblocking agents; and defoamers.

[Applications]

The dispersion stabilizer for suspension polymerization of the present invention is suitably used particularly for suspension polymerization of a vinyl compound in an aqueous medium. A method for producing a vinyl resin including suspension polymerization of a vinyl compound in an aqueous medium in the presence of the dispersion stabilizer of the present invention is a suitable embodiment of the present invention. Examples of the vinyl compound include vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; styrene; acrylonitrile, vinylidene chloride; and vinyl ether. Among these, the dispersion stabilizer for suspension polymerization of the present invention is particularly suitably used in suspension polymerization of vinyl chloride alone or in suspension polymerization of vinyl chloride together with a monomer copolymerizable with vinyl chloride. Examples of the monomer copolymerizable with vinyl chloride include vinyl esters such as vinyl acetate and vinyl propionate; (meth) acrylic acid esters such as methyl (meth)acrylate and ethyl (meth)acrylate; α-olefins such as ethylene and propylene; unsaturated dicarboxylic acids such as maleic anhydride and itaconic acid; acrylonitrile, styrene; vinylidene chloride; and vinyl ether.

For the suspension polymerization of the vinyl compound, oil-soluble or water-soluble polymerization initiators that have been conventionally used for polymerization of vinyl chloride monomers or the like can be used. Examples of the oil-soluble polymerization initiators include percarbonate compounds such as diisopropyl peroxydicarbonate, di-2-ethylhexyl peroxydicarbonate, and diethoxyethyl peroxydicarbonate, perester compounds such as t-butyl peroxyneodecanate, t-butyl peroxypivalate, t-hexyl peroxypivalate, and α-cumyl peroxyneodecanate, peroxides such as acetylcyclohexylsulfonyl peroxide, 2,4,4-trimethylpentyl-2-peroxyphenoxyacetate, 3,5,5-trimethylhexanoyl peroxide, and lauroyl peroxide; and azo compounds such as azobis-2,4-dimethylvaleronitrile, and azobis (4-2,4-dimethylvaleronitrile). Examples of the water-soluble polymerization initiators include potassium persulfate, ammonium persulfate, hydrogen peroxide, and cumene hydroperoxide. One of these oil-soluble or water-soluble polymerization initiators can be used alone, or two or more of them can be used in combination.

In the suspension polymerization of the vinyl compound, the polymerization temperature is not particularly limited. It is possible to adjust the temperature, of course, to a low temperature of about 20° C., also to a high temperature exceeding 90° C. Further, use of a polymerizer equipped with a reflux condenser for enhancing the heat removal efficiency from the polymerization reaction system is also one of the preferable embodiments.

In the suspension polymerization of the vinyl compound, the ratio of the vinyl compound to the aqueous medium to be introduced is not specifically limited. Generally, the lower the ratio of the vinyl compound with respect to the aqueous medium, the polymerization is more stable, but the productivity is lower, whereas the higher the ratio of the vinyl compound with respect to the aqueous medium, the productivity is higher, but the polymerization is less stable. In the method for producing a vinyl resin of the present invention, a mass ratio (vinyl compound/aqueous medium) of the vinyl compound with respect to the aqueous medium is preferably 0.57 to 1.25, more preferably 0.57 to 1.11. In the case where the mass ratio (vinyl compound/aqueous medium) is less than 0.57, the productivity of the vinyl resin to be obtained may possibly decrease. On the other hand, in the case where the mass ratio (vinyl compound/aqueous medium) exceeds 1.25, coarse resin particles may possibly be produced due to a decrease in polymerization stability. Further, fish-eyes in a formed product of the vinyl resin to be obtained may possibly increase.

In order to improve the productivity, the mass ratio (vinyl compound/aqueous medium) of the vinyl compound is preferably 0.75 to 1.25, in the method for producing a vinyl resin of the present invention. Under such conditions in which the ratio of the vinyl compound is high, and the polymerization generally tends to be unstable, the dispersion stabilizer for suspension polymerization of the present invention can further exert the effect of reducing fish-eyes in a formed product of the vinyl resin to be obtained.

[Components to be Used in Combination]

In the method for producing a vinyl resin of the present invention, the dispersion stabilizer for suspension polymerization of the present invention may be used alone, but it is preferable that the suspension polymerization of the vinyl compound is performed in the presence of the dispersion stabilizer and PVA with a viscosity-average degree of polymerization of 650 or more and a degree of saponification of 65 mol % or more. Use of such PVA in combination further improves the polymerization stability of the vinyl compound and further suppresses the occurrence of coarse resin particles.

The degree of saponification of the polyvinyl alcohol that is suitably used in combination in the present invention is preferably 65 mol % or more, more preferably 65 mol % or more and 95 mol % or less, further preferably 70 mol % or more and 90 mol or less. In the case where the degree of saponification of the polyvinyl alcohol is less than 65 mol %, the handleability may possibly deteriorate due to a decrease in water-solubility of the polyvinyl alcohol.

Further, the viscosity-average degree of polymerization of the polyvinyl alcohol that is suitably used in combination in the present invention is preferably 650 or more, more preferably 650 or more and 8000 or less, further preferably 650 or more and 3500 or less. In the case where the viscosity-average degree of polymerization of the polyvinyl alcohol is less than 650, the polymerization stability in the suspension polymerization of the vinyl compound may possibly decrease. The viscosity-average degree of polymerization of polyvinyl alcohol is calculated using Nakajima's equation (Akio Nakajima, "Kobunshi-Kagaku" (Polymer Science) 6 (1949)) from a limiting viscosity determined for an acetone solution of a vinyl ester polymer produced by substantially completely saponifying a polyvinyl alcohol followed by acetylation.

The addition amount of the polyvinyl alcohol to be used in combination with the dispersion stabilizer for suspension polymerization of the present invention is not particularly limited, but is preferably 40 to 900 parts by mass, more preferably 100 to 900 parts by mass, with respect to 100 parts by mass of the dispersion stabilizer for suspension polymerization of the present invention. In the case where the addition amount of the polyvinyl alcohol is less than 40 parts by mass, an adverse effect may possibly be exerted on the polymerization stability. On the other hand, in the case where the addition amount exceeds 900 parts by mass, the effect exerted by adding the dispersant for suspension polymerization of the present invention may possibly be insufficient.

In the present invention, the aforementioned polyvinyl alcohol may be used alone, or two or more types thereof having different properties may be used in combination.

The degree of saponification of the aforementioned polyvinyl alcohol is a value obtained by measurement according to JIS-K6726. The aforementioned PVA can be produced by the method described above as a method for producing the polyvinyl alcohol contained in the dispersant (A).

Further, in the method for producing a vinyl resin of the present invention, water-soluble cellulose ethers such as methyl cellulose, hydroxyethyl cellulose, hydroxypropyl cellulose, and hydroxypropyl methyl cellulose; water-soluble polymers such as gelatin; oil-soluble emulsifiers such as sorbitan monolaurate, sorbitan trioleate, glycerin tristearate, and a block copolymer of ethylene oxide and propylene oxide; water-soluble emulsifiers such as polyoxyethylene sorbitan monolaurate, polyoxyethylene glycerin oleate, and sodium laurate, or the like, which are generally used in suspension polymerization of a vinyl compound in an aqueous medium, may be used in combination. The addition amount thereof is not particularly limited, but is preferably 0.01 part by mass or more and 1.0 part by mass or less per 100 parts by mass of the vinyl compound.

EXAMPLES

Hereinafter, the present invention will be described further in detail by way of examples. In Examples and Comparative Examples below, "part(s)" and "%" respectively indicate part(s) by mass and mass %, unless otherwise specified.

Each emulsion obtained by the following preparation examples was evaluated according to the following method.

[Weight-Average Molecular Weight (Mw) of Emulsion]

The emulsion was dried and solidified at a temperature of 20° C. and a humidity of 65% to create an emulsion film having a thickness of about 500 μm. The film was dissolved in the same solvent as the mobile phase to obtain a solution in which the solid content of the emulsion was dissolved, and thereafter the solution was measured by gel permeation chromatography (GPC). [Device: HLC-8220GPC, manufactured by TOSOH CORPORATION, Column: GMHHR-H (S)×2, Mobile phase: HFIP+20 mM CF3COONa, Measurement temperature: 40° C., Standards: polymethylmethacrylate (PMMA)]

[Ratio of Dispersant (A) with Respect to Total Solid Content of Emulsion]

The emulsion was diluted to a concentration of about 5%. About 2 g of the diluted emulsion was taken out into an aluminum container, followed by drying at 105° C. for 3 h, to measure the mass of the resultant solid content. An accurate solid content $a$ (%) of the dilute liquid was determined from the following formula.

Solid content $a$ (%)=[Solid content (g)/Dilute emulsion (g) before drying]×100

About 100 g of the dilute emulsion the solid content of which had been measured in advance was accurately weighed, followed by centrifugation under conditions of a temperature of 10° C. and a rotational speed of 20000 rpm for 1 h, and thereafter all the supernatant was collected. About 80 g of the supernatant obtained was taken out into an aluminum container, followed by drying at 105° C. for 24 h to complete dryness, to obtain a dried solid content. After the mass of the solid content obtained from the supernatant was measured, the ratio of the dispersant (A) with respect to the total solid content of the emulsion was determined by the following formula.

Ratio of dispersant $(A)=c/[(a/100) \times b]$ a: Solid content (%) of dilute emulsion
b: Mass (g) of dilute emulsion
c: Mass (g) of solid content in supernatant

[Ratio of Dispersoid (B) and Graft Polymer (C) with Respect to Total Solid Content of Emulsion]

The precipitate obtained by the aforementioned centrifugation was ground, followed by complete drying in a dryer at 105° C. for 3 hours, and thereafter about 1 g thereof was accurately weighed, followed by immersion in about 50 mL of toluene, which was allowed to stand still at room temperature for 24 hours. The container containing these ingredients was gently shaken by a hand, and insolubles were immediately collected by a 200-mesh stainless steel wire mesh. The insolubles on the wire mesh were dried at 105° C. for 24 h, and thereafter the mass was measured. By the following formula, the ratio of the graft polymer (C) that was insoluble in toluene and the ratio of the dispersoid (B) that was soluble in toluene, with respect to the total solid content of the emulsion, were determined.

Ratio of toluene-insoluble components in precipitate=Dry mass of toluene insolubles (g)/Dry mass of precipitate (g)

Ratio of graft polymer $(C)$=Ratio of toluene-insoluble components in precipitate×[1−(ratio of dispersant $A$)]

Ratio of dispersoid $(B)$=1−[(Ratio of dispersant $A$)+(Ratio of graft polymer $C$)]

[Storage Stability of Emulsion]

The storage stability of the emulsion was evaluated by allowing a synthesized emulsion to stand at 25° C. and counting the number of days until precipitate occurs.
A: No precipitate occurred for 30 days or more
B: Precipitate occurred within 30 days Example 1: Production of Em-1

108 parts of ion exchanged water, 9 parts of EMULGEN 1150S-60 (manufactured by Kao Corporation) that was a nonionic surfactant as the dispersant (A), and 0.1 part of sodium acetate were introduced into a 2-L glass polymerization vessel equipped with a reflux condenser, a dropping funnel, a thermometer, and a nitrogen injection port, followed by complete dissolution at 80° C. Next, after nitrogen substitution, 3.1 parts of a 1% aqueous solution of sodium hydrogen carbonate as a reductant and 11 parts of a 1% aqueous solution of ammonium persulfate as an initiator were introduced therein. 11 parts of a 1% aqueous solution of ammonium persulfate and 100 parts of vinyl acetate monomer as the ethylenically unsaturated monomer were continuously added over 3 hours under stirring at 200 rpm to complete polymerization. The resultant emulsion had a solid content of 45%, a weight-average molecular weight (Mw) of 280,000, a ratio of the dispersant (A) of 0.08, a ratio of the dispersoid (B) of 0.92, and a ratio of the graft polymer (C) of 0, with respect to the total solid content of the emulsion, and a storage stability of 30 days or more.

Examples 2 to 10 and Comparative Example 1: Production of (Em-2 to 10 and 12)

Emulsions (Em-2 to 10 and 12) shown in Table 1 were produced in the same manner as in Example 1 except that the polymerization conditions such as the type of the ethylenically unsaturated monomer, the type of the dispersant (A), the used amount thereof, and the introduced amount of ion exchanged water were changed. The production conditions and the physical property values of the synthesized emulsions are shown in Table 1, and the type of the dispersant (A) used is shown in Table 2.

Example 11: Production of (Em-11)

An emulsion (Em-11) shown in Table 1 was produced in the same manner as in Example 1 except that the polymerization conditions such as the introduced amount of ion exchanged water were changed, and the polymerization was performed while dodecanethiol as a chain transfer agent was mixed with the vinyl acetate monomer at a ratio shown in Table 1 and was continuously added. The production conditions and the physical property values of the synthesized emulsion are shown in Table 1.

Comparative Example 2: Production of (Em-13)

232 parts of ion exchanged water, 9 parts of polyoxyethylene nonylphenyl ether that was a nonionic surfactant as the dispersant (A), and 0.1 part of sodium acetate were introduced into a 2-L glass polymerization vessel equipped with a reflux condenser, a dropping funnel, a thermometer, and a nitrogen injection port, followed by complete dissolution at 80° C. Next, after nitrogen substitution, 4 parts of a 1% aqueous solution of ammonium persulfate as an initiator and 11 parts of vinyl acetate monomer were introduced therein. Under stirring at 200 rpm, 89 parts of vinyl acetate monomer was continuously added thereto over 3 hours, and 18 parts of a 1% aqueous solution of ammonium persulfate was further added thereto in four separate times, to complete polymerization. The resultant emulsion had a solid content of 30%, a weight-average molecular weight (Mw) of 620,000, a ratio of the dispersant (A) of 0.06, a ratio of the dispersoid (B) of 0.88, and a ratio of the graft polymer (C) of 0.06, with respect to the total solid content of the emulsion, and a storage stability of less than 30 days.

Comparative Example 3: Production of (Em-14)

An emulsion (Em-14) shown in Table 1 was produced in the same manner as in Comparative Example 2 except that the introduced amount of ion exchanged water was changed, with the change of the target solid content. The production conditions and the physical property values of the synthesized emulsions are shown in Table 1.

Comparative Example 4: Production of (Em-15)

133 parts of water and 9 parts of EMULGEN 1150S-60 as the dispersant (A) were added to 100 parts of polyvinyl acetate powder with a viscosity-average degree of polymerization of 250 that had been synthesized in advance as the dispersoid (B), followed by stirring, in an attempt to obtain an aqueous emulsion. However, the dispersoid (B) was not dispersed, and precipitate remained as it occurred.

TABLE 1

| | | | | | Chain transfer agent | | Physical property values of aqueous emulsion | | | | | |
|---|---|---|---|---|---|---|---|---|---|---|---|---|
| | | Synthesis | | | | | | | | | | |
| | | Unsaturated monomer | | Dispersant (A) | | | | | | | Weight-average molecular weight | Storage |
| | Aqueous emulsion | Type | Part(s) | Type | Part(s) | Type | Total amount added wt %/ VAc | Solid content (%) | A/(A + B + C) | B/(A + B + C) | C/(A + B + C) | Mw | stability |
| Example 1 | Em-1 | Vinyl acetate | 100 | A | 9 | — | — | 45 | 0.08 | 0.92 | 0.00 | 280,000 | A |
| Example 2 | Em-2 | Vinyl propionate | 100 | A | 9 | — | — | 45 | 0.08 | 0.92 | 0.00 | 390,000 | A |
| Example 3 | Em-3 | Vinyl acetate/ Methyl acrylate (95/5) | 100 | A | 9 | — | — | 45 | 0.08 | 0.91 | 0.01 | 420,000 | A |
| Example 4 | Em-4 | Styrene | 100 | A | 9 | — | — | 45 | 0.08 | 0.92 | 0.00 | 360,000 | A |
| Example 5 | Em-5 | Vinyl acetate | 100 | B | 12 | — | — | 45 | 0.10 | 0.89 | 0.01 | 290,000 | A |
| Example 6 | Em-6 | Vinyl acetate | 100 | C | 9 | — | — | 45 | 0.08 | 0.92 | 0.00 | 370,000 | A |
| Example 7 | Em-7 | Vinyl acetate | 100 | D | 9 | — | — | 45 | 0.08 | 0.92 | 0.00 | 400,000 | A |
| Example 8 | Em-8 | Vinyl acetate | 100 | E | 9 | — | — | 45 | 0.08 | 0.92 | 0.00 | 450,000 | A |
| Example 9 | Em-9 | Vinyl acetate | 100 | F | 9 | — | — | 45 | 0.08 | 0.92 | 0.00 | 430,000 | A |
| Example 10 | Em-10 | Vinyl acetate | 100 | A + G | 8 + 2 | — | — | 45 | 0.07 | 0.90 | 0.03 | 290,000 | A |
| Example 11 | Em-11 | Vinyl acetate | 100 | A | 9 | Dodecanethiol | 2.0 | 55 | 0.08 | 0.92 | 0.00 | 90,000 | A |
| Comparative Example 1 | Em-12 | Vinyl acetate | 100 | A | 30 | — | — | 45 | 0.22 | 0.77 | 0.01 | 340,000 | A |
| Comparative Example 2 | Em-13 | Vinyl acetate | 100 | H | 9 | — | — | 30 | 0.06 | 0.88 | 0.06 | 620,000 | B |
| Comparative Example 3 | Em-14 | Vinyl acetate | 100 | H | 9 | — | — | 45 | 0.06 | 0.86 | 0.08 | 680,000 | A |

TABLE 2

| Type | Info |
|---|---|
| A | EMULGEN 1150S-60 |
| B | RHEODOL TW-O120V |
| C | EMAL 0 |
| D | LATEMUL E-150 |
| E | QUARTAMIN 86P CONC |
| F | AMPHITOL 20BS |
| G | ADEKA REASOAP NE-10 |
| H | Polyoxyethylene nonylphenyl ether |

Example 2-1

Polyvinyl alcohol with a degree of polymerization of 2000 and a degree of saponification of 80 mol % was introduced as 100 parts of a solution of deionized water into an autoclave with a capacity of 5 L to give 800 ppm with respect to the vinyl chloride monomer, the above Em-1 was then introduced therein so as to give 200 ppm with respect to the vinyl chloride monomer in terms of solid content, and deionized water was additionally introduced therein so that the total of deionized water to be introduced was 1200 parts. Subsequently, 0.65 part of a 70% toluene solution of cumyl peroxyneodecanoate and 1.05 parts of a 70% toluene solution of t-butyl peroxyneododecanoate were introduced into the autoclave, and an operation of introducing nitrogen into the autoclave to a pressure of 0.2 MPa, followed by purging the introduced nitrogen, was repeated 5 times, so that the inside of the autoclave was sufficiently substituted with nitrogen to remove oxygen. Thereafter, 940 parts of vinyl chloride was introduced therein, and the contents in the autoclave were heated to 57° C., to start polymerization of the vinyl chloride monomer under stirring. The pressure inside the autoclave at the start of the polymerization was 0.80 MPa. After a lapse of about 3.5 hours from the start of the polymerization, the polymerization was stopped at the time when the pressure inside the autoclave reached 0.70 MPa, and a polymerization reaction product was taken out after unreacted vinyl chloride monomer was removed, followed by drying at 65° C. for 16 hours, to obtain vinyl chloride resin particles.

(Evaluation of Vinyl Chloride Resin Particles)

Regarding to vinyl chloride resin particles obtained in Example 2-1, the plasticizer absorption, the number of fish-eyes when they were processed into a sheet, and the hue (YI) when a thick film was produced were evaluated according to the following methods.

(1) Plasticizer Absorption

The mass of a syringe with a capacity of 5 mL filled with 0.02 g of absorbent cotton was weighed (referred to as A g), then 0.5 g of the vinyl chloride resin particles was put therein, and the mass was weighed (referred to as B g). 1 g of dioctyl phthalate (DOP) was put therein and was allowed to stand still for 15 minutes, followed by centrifugation at 3000 rpm for 40 minutes to weight the mass (referred to as C g). Then, the plasticizer absorption (%) was determined by the following formula.

Plasticizer absorption (%)=100×[{(C−A)/(B−A)}−1]

(2) Fish-Eyes 100 parts of the resultant vinyl chloride resin particles, 50 parts of DOP (dioctyl phthalate), 5 parts of tribasic lead sulfate, and 1 part of zinc stearate were subjected to roll kneading at 150° C. for 7 minutes to produce a 0.1-mm thick sheet, for which the number of fish-eyes per 100 mm×100 mm was counted.

(3) Hue (YI)

100 parts of the resultant vinyl chloride resin particles, 3 parts of TVS # N-2000E (manufactured by Nitto Kasei Co., Ltd.) that was a tin-based stabilizer, and 0.01 part of ultramarine blue were subjected to roll kneading at 170° C. for 10 minutes to a thickness of 0.4 mm. Thereafter, the resultant sheet was pressed under heating at 185° C. and a pressure of 120 kg/cm² for 5 minutes, and thereafter was pressed at 20° C. and a pressure of 150 kg/cm² for 5 minutes under cooling to create a thick film of 42×25×5 mm.

The hue (YI) of the created thick film was measured using a color meter (SM-T-H1, manufactured by Suga Test Instruments Co., Ltd.) according to JIS-K7105. It is indicated that the larger the value, the vinyl chloride resin was more decomposed by heat to be colored yellow.

Examples 2-2 to 2-11

Vinyl chloride resin particles were obtained by performing suspension polymerization of vinyl chloride in the same manner as in Example 2-1 except that Em-2 to 11 were respectively used instead of Em-1. The evaluation results for the vinyl chloride resin particles are shown in Table 3.

Example 2-12

Vinyl chloride resin particles were obtained by performing suspension polymerization of vinyl chloride in the same manner as in Example 2-1 except that the used amount of deionized water was changed to 1390 parts. The evaluation results for the vinyl chloride resin particles are shown in Table 4.

Comparative Example 2-1

The suspension polymerization of vinyl chloride was performed in the same manner as in Example 2-1 except that Em-1 was not used. The evaluation results for the vinyl chloride resin particles are shown in Table 3. In this case, the plasticizer absorption of the obtained vinyl chloride resin particles was insufficient, a very large number of fish-eyes were present, and the hue also was not satisfactory.

Comparative Example 2-2

The suspension polymerization of vinyl chloride was performed in the same manner as in Example 2-1 except that Em-12 was used instead of Em-1. The evaluation results for the vinyl chloride resin particles are shown in Table 3. In this case, a very large number of fish-eyes were present in the obtained vinyl chloride resin particles, and the hue also was not satisfactory.

Comparative Example 2-3

The suspension polymerization of vinyl chloride was performed in the same manner as in Example 2-1 except that Em-13 was used instead of Em-1. The evaluation results for the vinyl chloride resin particles are shown in Table 3. In this case, the plasticizer absorption of the obtained vinyl chloride resin particles was insufficient, a very large number of fish-eyes were present, and the hue also was not satisfactory.

Comparative Example 2-4

The suspension polymerization of vinyl chloride was performed in the same manner as in Example 2-1 except that Em-14 was used instead of Em-1. The evaluation results for the vinyl chloride resin particles are shown in Table 3. In this case, the plasticizer absorption of the obtained vinyl chloride resin particles was insufficient, a very large number of fish-eyes were present, and the hue also was not satisfactory.

Comparative Example 2-5

The suspension polymerization of vinyl chloride was performed in the same manner as in Example 2-1 except that a 30 wt % aqueous solution of partially saponified polyvinyl alcohol (PVA-1) with a viscosity-average degree of polymerization of 250 and a degree of saponification of 60 mol % was used instead of Em-1. The evaluation results for the vinyl chloride resin particles are shown in Table 5. In this case, the plasticizer absorption of the obtained vinyl chloride resin particles was insufficient, a very large number of fish-eyes were present, and the hue also was not satisfactory. Further, if PVA-1 is synthesized as a solution with a concentration equal to or higher than this concentration, the viscosity may possibly be very high, in which case the handleability deteriorates. Further, in preparation of an aqueous solution of PVA, a time-consuming operation of dissolving PVA in water is required. Therefore, the economic efficiency and the productivity are poor, as compared with the emulsions of the present invention that are already in liquid state when synthesized.

Comparative Example 2-6

Vinyl chloride resin particles were obtained by performing the suspension polymerization of vinyl chloride in the same manner as in Comparative Example 2-2 except that the used amount of deionized water was changed to 1390 parts in total. The evaluation results for the vinyl chloride resin particles are shown in Table 4. In this case, the plasticizer absorption of the obtained vinyl chloride resin particles was insufficient, a very large number of fish-eyes were present, and the hue also was not satisfactory. Further, as Examples 2-1 and 2-12 in Table 4 are respectively compared with Comparative Examples 2-2 and 2-6, the emulsions of the present invention were able to exert excellent effects in improving the plasticizer absorption, reducing fish-eyes, and improving the hue, even under the polymerization conditions in which the ratio of vinyl chloride used was larger.

TABLE 3

| | Dispersion stabilizer for suspension polymerization | Evaluation results for vinyl chloride polymer particles | | |
| --- | --- | --- | --- | --- |
| | | Plasticizer absorption (%) | Fish-eyes (number) | YI |
| Example 2-1 | Em-1 | 24.7 | 9 | 27.4 |
| Example 2-2 | Em-2 | 24.6 | 10 | 28.8 |
| Example 2-3 | Em-3 | 23.9 | 12 | 29.7 |
| Example 2-4 | Em-4 | 23.1 | 12 | 29.9 |
| Example 2-5 | Em-5 | 24.4 | 9 | 27.6 |
| Example 2-6 | Em-6 | 22.8 | 14 | 30.0 |
| Example 2-7 | Em-7 | 22.6 | 15 | 30.1 |
| Example 2-8 | Em-8 | 25.2 | 4 | 27.7 |
| Example 2-9 | Em-9 | 24.6 | 9 | 28.1 |
| Example 2-10 | Em-10 | 22.9 | 16 | 31.4 |
| Example 2-11 | Em-11 | 25.1 | 6 | 26.7 |
| Comparative Example 2-1 | — | 14.4 | >5000 | 31.3 |
| Comparative Example 2-2 | Em-12 | 22.4 | 170 | 35.2 |
| Comparative Example 2-3 | Em-13 | 21.1 | 300 | 32.9 |
| Comparative Example 2-4 | Em-14 | 20.0 | 420 | 33.9 |
| Comparative Example 2-5 | PVA-1 | 19.8 | 480 | 30.5 |

TABLE 4

| | Dispersion stabilizer for suspension polymerization | Vinyl chloride monomer/ water | Evaluation results for vinyl chloride polymer particles | | |
| --- | --- | --- | --- | --- | --- |
| | | | Plasticizer absorption (%) | Fish-eyes (number) | YI |
| Example 2-1 | Em-1 | 940/1200 | 24.7 | 9 | 27.4 |
| Example 2-12 | Em-1 | 940/1390 | 24.9 | 9 | 27 |
| Comparative Example 2-2 | Em-12 | 940/1200 | 22.4 | 170 | 35.2 |
| Comparative Example 2-6 | Em-12 | 940/1390 | 22.8 | 96 | 34.5 |

As shown in Examples, in the case where the dispersion stabilizer of the present invention is used for the suspension polymerization of the vinyl compound, polymer particles that have high plasticizer absorption and that can be easily processed can be obtained even when it is used in a small amount, where a reduction in fish-eyes when vinyl resin is formed into a sheet and hue improvement are enabled. Further, production as a liquid with high concentration exceeding 35% is enabled, and the liquid itself can be introduced into a polymerization tank in which the suspension polymerization of the vinyl compound is performed. Therefore, the handleability and the economic efficiency are very excellent. Accordingly, the industrial usefulness of the dispersion stabilizer for suspension polymerization of the present invention is exceptionally high.

The invention claimed is:

1. A dispersion stabilizer for suspension polymerization comprising an aqueous emulsion comprising a dispersant (A), a dispersoid (B), a graft polymer (C), and an aqueous medium, wherein:
   the dispersant (A) consists of a nonionic surfactant, a cationic surfactant, or an amphoteric surfactant,
   wherein when the dispersant (A) is a nonionic surfactant, the nonionic surfactant is polyoxyethylene alkyl ether, polyoxyethylene sorbitan ester or glycerin ester,
   the dispersoid (B) comprises a polymer comprising an ethylenically unsaturated monomer unit,
   the graft polymer (C) is obtained by graft polymerization of the ethylenically unsaturated monomer with the dispersant (A),
   a mass ratio [A/(A+B+C)] of the dispersant (A) with respect to a total amount of the dispersant (A), the dispersoid (B), and the graft polymer (C) is 0.001 or more and less than 0.18, a mass ratio [C/(A+B+C)] of the graft polymer (C) with respect to the total amount of the dispersant (A), the dispersoid (B), and the graft polymer (C) is 0 or more and less than 0.04, and a total content of the dispersant (A), the dispersoid (B), and the graft polymer (C) is 35 to 70 mass %.

2. The dispersion stabilizer according to claim 1, wherein the dispersoid (B) comprises a polyvinyl ester.

3. The dispersion stabilizer according to claim 2, wherein the polyvinyl ester is polyvinyl acetate.

4. The dispersion stabilizer according to claim 1, wherein a weight-average molecular weight of a solid content in the aqueous emulsion as measured by gel permeation chromatography is 1,000,000 or less.

5. The dispersion stabilizer according to claim 1, wherein the dispersant (A) comprises a nonionic surfactant or a cationic surfactant.

6. A method for producing the dispersion stabilizer according to claim 1, the method comprising:
obtaining the aqueous emulsion by polymerization of 100 parts by mass of the ethylenically unsaturated monomer in the aqueous medium in the presence of 1 to 20 parts by mass of the dispersant (A).

7. The method according to claim 6, wherein the aqueous emulsion is obtained by polymerization of the ethylenically unsaturated monomer in the presence of a chain transfer agent and the dispersant (A).

8. A method for producing a vinyl resin, the method comprising: performing suspension polymerization of a vinyl compound in an aqueous medium in the presence of the dispersion stabilizer according to claim 1.

9. The method according to claim 8, wherein a mass ratio of the vinyl compound with respect to the aqueous medium is 0.57 to 1.25.

* * * * *